United States Patent
Verbeke et al.

(10) Patent No.: US 10,640,601 B2
(45) Date of Patent: *May 5, 2020

(54) IN-SITU FORMATION OF POLYURETHANE CATALYSTS

(71) Applicant: Huntsman International LLC, The Woodlands, TX (US)

(72) Inventors: Hugo Verbeke, Wilsele (BE); Hans Godelieve Guido Verbeke, Lubbeek (BE); Giacomo Giannini, Tervuren (BE); Christian Esbelin, Bollene (FR)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/579,223

(22) PCT Filed: May 31, 2016

(86) PCT No.: PCT/EP2016/062203
§ 371 (c)(1),
(2) Date: Dec. 4, 2017

(87) PCT Pub. No.: WO2016/202568
PCT Pub. Date: Dec. 22, 2016

(65) Prior Publication Data
US 2018/0179321 A1  Jun. 28, 2018

(30) Foreign Application Priority Data

Jun. 18, 2015 (EP) .................................. 15172746

(51) Int. Cl.
C08G 18/22 (2006.01)
C08G 59/40 (2006.01)
(Continued)

(52) U.S. Cl.
CPC .......... *C08G 18/225* (2013.01); *C08G 18/10* (2013.01); *C08G 18/3206* (2013.01);
(Continued)

(58) Field of Classification Search
CPC .. C08G 18/225; C08G 18/3206; C08G 18/58; C08G 18/6517; C08G 18/7671
See application file for complete search history.

(56) References Cited

U.S. PATENT DOCUMENTS 9,018,333 B2 * 4/2015 Debien ................ C08G 18/003
252/182.2
9,631,043 B2 * 4/2017 Esbelin .............. C08G 18/4829
(Continued)

FOREIGN PATENT DOCUMENTS

WO  2010121898 A1  10/2010
WO  2013098034 A1  7/2013
WO  2015078740 A1  6/2015

OTHER PUBLICATIONS

The ICI Polyurethanes Book by G. Woods 1990, 2nd edition pp. 32-35.

Primary Examiner — Michael L Leonard
(74) Attorney, Agent, or Firm — Robert Diaz; Huntsman International LLC

(57) ABSTRACT

An in-situ formed polyurethane catalyst for catalyzing the formation of polyurethane in a reactive composition comprising polyisocyanate compounds and isocyanate reactive compounds, said catalyst formed by combining in said reactive composition:
  At least one lithium halide compound, and
  At least one epoxide compound
wherein the amount of epoxide to be used is such that the number of epoxide equivalents per isocyanate equivalents is
(Continued)

Figure 1:
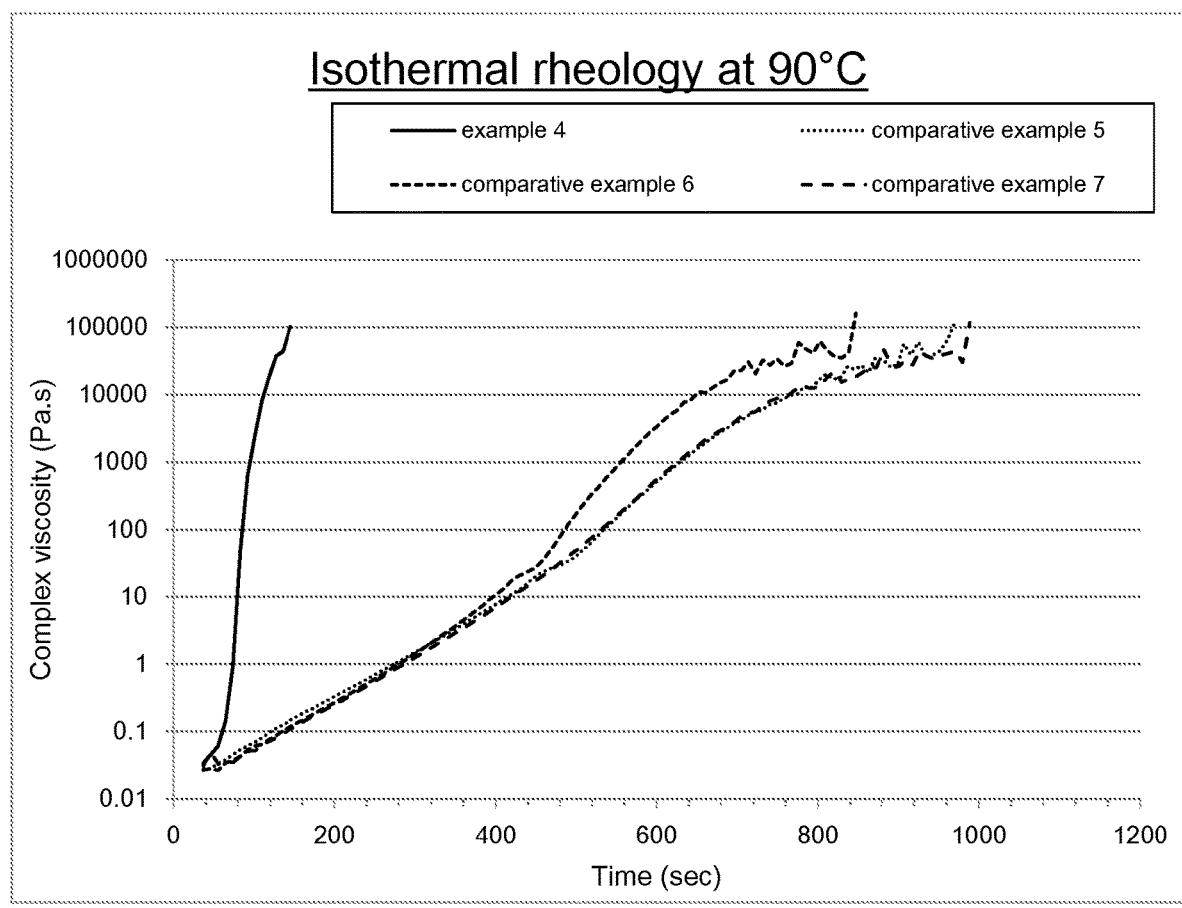

from larger than 0 up to 0.095 and the number of moles of lithium halide per isocyanate equivalent ranging of from 0.0001-0.06.

16 Claims, 6 Drawing Sheets

(51) Int. Cl.
  *C08G 18/58*   (2006.01)
  *C08G 18/10*   (2006.01)
  *C08G 18/48*   (2006.01)
  *C08G 18/32*   (2006.01)
  *C08G 18/65*   (2006.01)
  *C08G 18/76*   (2006.01)
  *C08G 18/78*   (2006.01)

(52) U.S. Cl.
  CPC ......... *C08G 18/4808* (2013.01); *C08G 18/58* (2013.01); *C08G 18/6517* (2013.01); *C08G 18/7671* (2013.01); *C08G 59/4021* (2013.01); *C08G 59/4028* (2013.01); *C08G 18/78* (2013.01); *C08G 18/7831* (2013.01)

(56) References Cited

U.S. PATENT DOCUMENTS

| | | | |
|---|---|---|---|
| 9,926,447 B2 * | 3/2018 | Esbelin | ................ C08G 59/066 |
| 2017/0267806 A1 * | 9/2017 | Goeschel | ............... C08G 18/58 |

* cited by examiner

IN-SITU FORMATION OF POLYURETHANE CATALYSTS

CROSS-REFERENCE TO RELATED APPLICATIONS

This application is the National Phase of International Application PCT/EP2016/062203 filed May 31, 2016 which designated the U.S. and which claims priority to European App. Serial No. 15172746.8 filed Jun. 18, 2015. The noted applications are incorporated herein by reference.

FIELD OF INVENTION

The present invention relates to in-situ formation of a polyurethane catalyst.

The present invention is further related to a process for making a polyurethane catalyst, to a composition comprising compounds suitable for making the in-situ polyurethane catalyst, to a reactive composition comprising the in-situ polyurethane catalyst, to a process for making such compositions, to a process for making polyurethane materials wherein the in-situ polyurethane catalyst according to the present invention is used and to polyurethane comprising materials made or obtainable from such reactive compositions.

The present invention is further related to the use of the in-situ formed polyurethane catalyst according to the present invention for achieving a remarkably long pot-life in reactive compositions comprising polyisocyanate and isocyanate reactive compounds followed by a rapid cure once the in-situ formed polyurethane catalyst starts to react.

The polyisocyanate reactive composition comprising the in-situ formed polyurethane catalyst according to the present invention is very suitable to make polyurethane materials in moldings.

BACKGROUND OF THE INVENTION

In the past much research has been devoted to the development of polyisocyanate reactive compositions which have a long pot life under ambient conditions and which react fast and cure fast once activated. Existing polyisocyanate reactive systems usually have a short pot-life (curing starts immediately) and need several hours at rather high temperatures to achieve full curing.

State of the art polyurethane catalysts react fast and cure fast once activated, typically such catalysts show an induction time of seconds up to a few minutes even at room temperature.

Alkoxides are known to be efficient polyurethane catalysts but without additional benefit on pot-life.

There is hence a need to develop a 2-component reactive polyisocyanate system to fabricate polyurethane materials whereby said 2-component reactive polyisocyanate system provides besides a longer pot-life no increase in curing time but gives both a good pot-life to make e.g. prepreg handling possible and a rapid cure once the reactive system starts to cure.

AIM OF THE INVENTION

It is a goal of the invention to increase the pot-life of a 2-component reactive polyisocyanate system without loosing on conversion rate and efficiency.

It is a further object of the present invention to achieve a rapid curing once the reactive system starts to cure.

SUMMARY OF THE INVENTION

According to a first aspect of the present invention an in-situ formed polyurethane catalyst suitable for catalyzing the formation of polyurethane in a reactive composition comprising polyisocyanate compounds and isocyanate reactive compound is disclosed. Said catalyst is formed by combining in said reactive composition at least one lithium halide compound and at least one epoxide compound. The amount of epoxide to be used is such that the number of epoxide equivalents per isocyanate equivalents is from larger than 0 up to 0.095 and the number of moles of lithium halide per isocyanate equivalent ranging of from 0.0001-0.06.

Preferably, the polyisocyanate compounds are selected from a toluene diisocyanate, a methylene diphenyl diisocyanate or a polyisocyanate composition comprising a methylene diphenyl diisocyanate or a mixture of such polyisocyanate compounds.

The number of moles of lithium halide per isocyanate equivalent is ranging from 0.0001-0.06 moles per isocyanate equivalent, preferably from 0.00015-0.025 moles per isocyanate equivalent and more preferably from 0.0005-0.02 moles per isocyanate equivalent.

The amount of epoxide to be used is such that the number of epoxide equivalents per isocyanate equivalents is from larger than 0 up to 0.095, preferably in the range 0.01 up to 0.095, more preferably in the range 0.03 up to 0.09.

Preferably, the isocyanate reactive compounds are selected from a polyester and/or polyether polyol having an average molecular weight of preferably 32-6000 and an average nominal functionality of preferably 1-8.

Preferably, the lithium halide is selected from lithium chloride and lithium bromide, most preferably the lithium halide is selected from lithium chloride.

Preferably, the epoxide compound(s) are selected from epoxide compounds which are liquid at room temperature.

According to a second aspect of the present invention, a reactive system is disclosed, said reactive system comprising the in-situ polyurethane catalyst according to first aspect of the invention. The reactive system is made by combining at least a monool or polyol composition, at least one lithium halide compound, a polyisocyanate composition comprising the polyisocyanate compounds, and at least one epoxide compound in such an amount that the number of equivalents of epoxide equivalents per isocyanate equivalents is from larger than 0 up to 0.095 and the number of moles of lithium halide per isocyanate equivalent ranging of from 0.0001-0.06.

Preferably, the polyisocyanate composition used to make the reactive system of the invention has an average isocyanate value of 1 to 48% by weight and preferably from 10 to 33% by weight.

The number of moles of lithium halide used to make the reactive system according to the invention is such that the number of moles of lithium halide per isocyanate equivalent is ranging from 0.0001-0.06, preferably from 0.00015-0.025 moles per isocyanate equivalent and more preferably from 0.0005-0.02 moles per isocyanate equivalent.

The number of epoxide equivalents used to make the reactive system according to the invention is such that the number of epoxide equivalents per isocyanate equivalents is in the range from larger than 0 up to 0.095, preferably in the range 0.01-0.095, more preferably in the range 0.03-0.09.

The isocyanate index of the reactive system according to the invention is in the range 60-750, preferably in the range 70-400, more preferably in the range 80-150 and most preferably in the range 80-130.

The reactive system according to the invention may further comprise additives such as other catalysts, blowing agents, surfactants, water scavengers, antimicrobial agents, fire retardants, smoke suppressants, UV-stabilizers, colorants, plasticizers, internal mould release agents, rheology modifiers, wetting agents, dispersing agents and fillers.

According to a third aspect of the present invention a process for making the reactive system according to the invention is disclosed. Said process comprises combining and dissolving the at least one lithium halide compound, the monool or polyol composition, the polyisocyanate composition, the at least one epoxide compound and optional further additives and/or fillers.

The invention further discloses polyurethane comprising materials and a process for making said polyurethane comprising materials by allowing the reactive system according to the invention to react at elevated temperature of at least 50° C., preferably at least 80° C.

The process for making a polyurethane comprising material according to the invention may further comprise before the step of heating the reactive system according to the invention a step of adding and mixing additives and/or to be bonded material(s) to the reactive system such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

The in-situ formed polyurethane catalyst according to the invention may be used for improving the pot-life of a reactive polyisocyanate system.

The independent and dependent claims set out particular and preferred features of the invention. Features from the dependent claims may be combined with features of the independent or other dependent claims as appropriate.

The above and other characteristics, features and advantages of the present invention will become apparent from the detailed description and examples set out further.

Definitions and Terms

In the context of the present invention the following terms have the following meaning:

1) The reactive composition (also referred to as 2-component reactive polyisocyanate system) comprising the in-situ formed catalyst according to the invention may also referred to in the text as "the curable composition".
2) The "isocyanate index" or "NCO index" or "index" is the ratio of NCO— groups over isocyanate-reactive hydrogen atoms present in a formulation, given as a percentage:

$$\frac{[NCO] \times 100}{[\text{active hydrogen}]} (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are also taken into account in the calculation of the isocyanate index.

3) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
4) "Reaction system": combination of components wherein the polyisocyanates are kept in one or more containers separate from the isocyanate-reactive components.
5) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
6) The word "average" refers to number average unless indicated otherwise.
7) "Liquid" means having a viscosity of less than 10 Pa·s measured according to ASTM D445-11a at 20° C.
8) "In-situ formed catalyst" refers to a polyurethane catalyst which is formed once the required compounds being present in two separate streams of the 2-component reactive polyisocyanate system are combined and react with each other to form a new compound which is acting as a polyurethane catalyst. The two parts of the 2-component reactive polyisocyanate system are mixed with one another only briefly prior to the fabrication of the polyurethane material.
9) "Pot-life" as used herein refers to the stability of the liquid 2-component reactive polyisocyanate system (e.g. the curable composition according to the invention) when stored under process conditions and is calculated as the period of time the reactive composition remains liquid after mixing the two parts of the 2-component reactive polyisocyanate system with or without subjecting the system to reaction-initiating conditions (such as subjecting to an elevated (mould) temperature).

10) "Polyurethane catalyst" or "PU catalyst" as used herein refers to a catalyst being able to catalyse (promote) the reaction of isocyanate groups with isocyanate reactive groups such as but not limited to the formation of polyurethane groups from polyisocyanates.

FIGURES

FIG. 1 illustrates the isothermal rheology profile at 90° C. for a 2-component reactive polyisocyanate system according to the present invention (example 4) and for comparable examples (examples 5, 6 and 7 without the in-situ formed catalyst).

Figure 2:
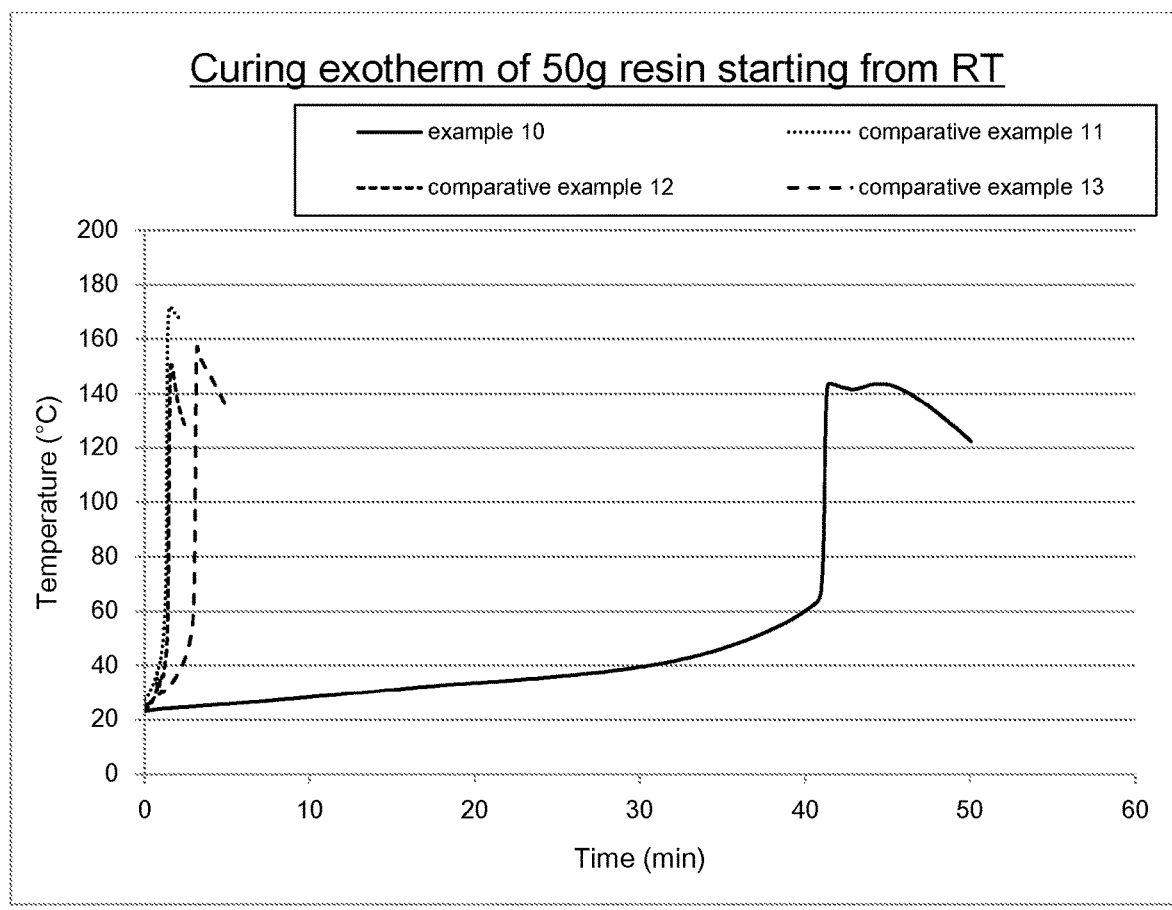

FIG. 2 illustrates the curing exotherm starting from room temperature (RT) for a 2-component reactive polyisocyanate system according to the present invention (example 10) and for comparable examples (examples 11, 12 and 13 using state of the art alkoxide PU catalysts).

Figure 3:
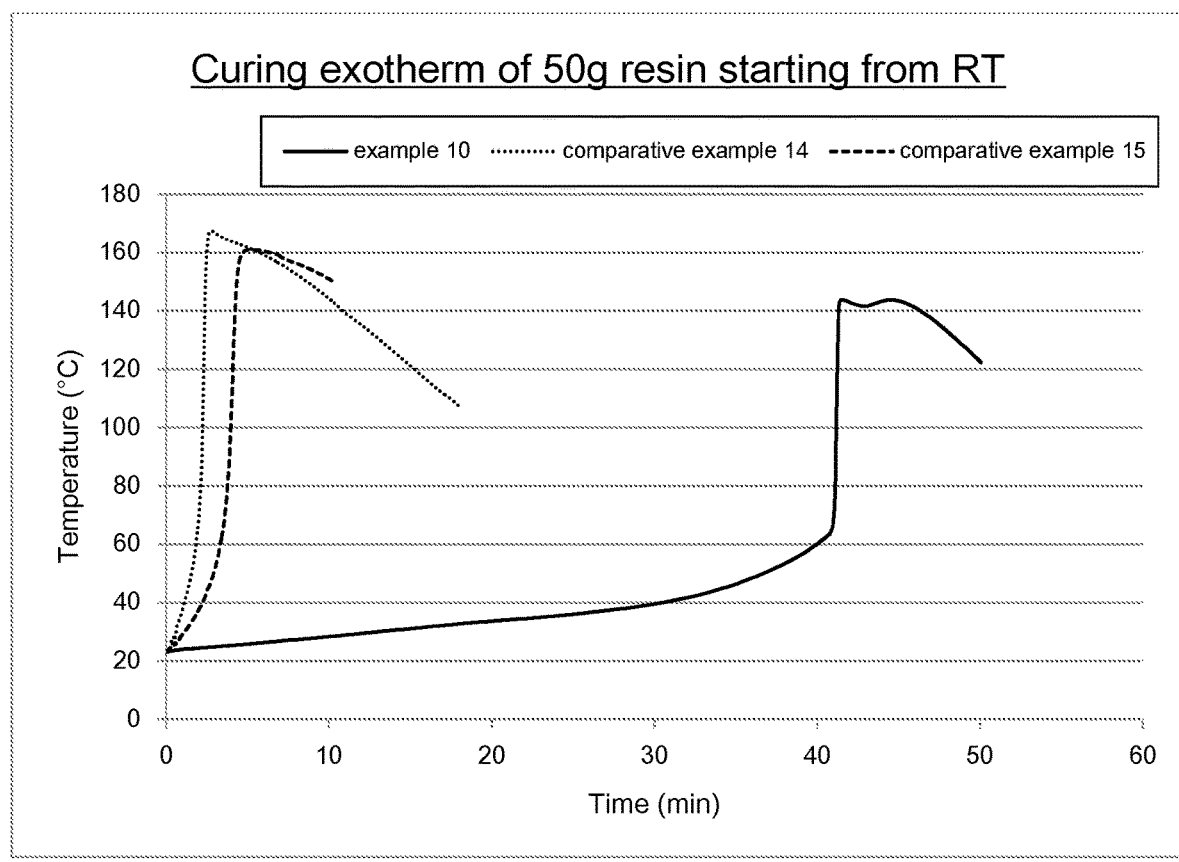

FIG. 3 illustrates the curing exotherm starting from room temperature (RT) for a 2-component reactive polyisocyanate system according to the present invention (example 10) and for comparable examples (examples 14 and 15 using state of the metal based PU catalysts).

Figure 4:
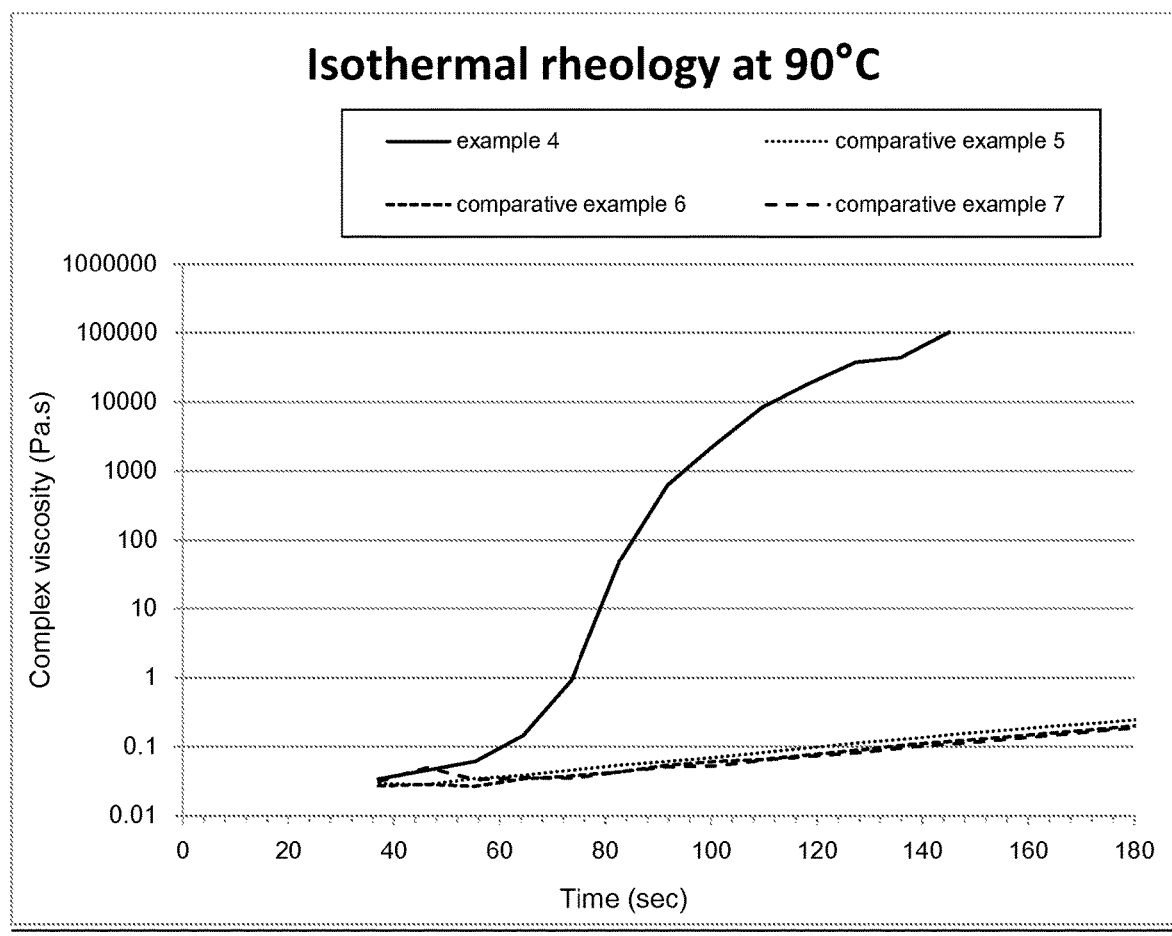

FIG. 4 illustrates the isothermal rheology profile at 90° C. for a 2-component reactive polyisocyanate system according to the present invention (example 4) and for comparable examples (examples 5, 6 and 7 without the in-situ formed catalyst). FIG. 4 is similar to FIG. 1 but with another time scaling.

Figure 5:
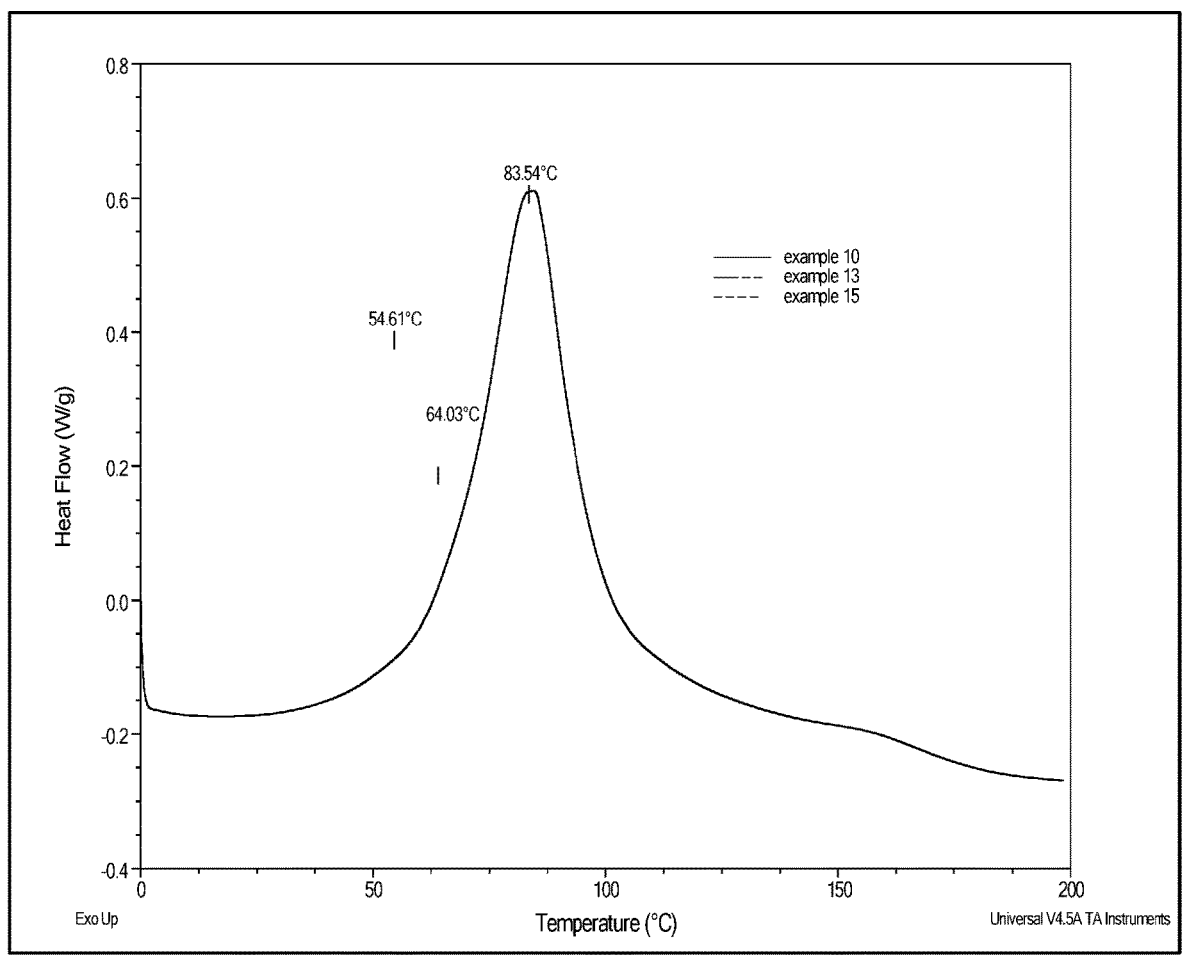

FIG. 5 illustrates Differential Scanning calorimetry (DSC) traces for a 2-component reactive polyisocyanate system according to the present invention (example 10) and for comparable examples (examples 13 (using a state of the alkoxide PU catalyst) and example 15 (using a state of the metal based PU catalyst)).

Figure 6:
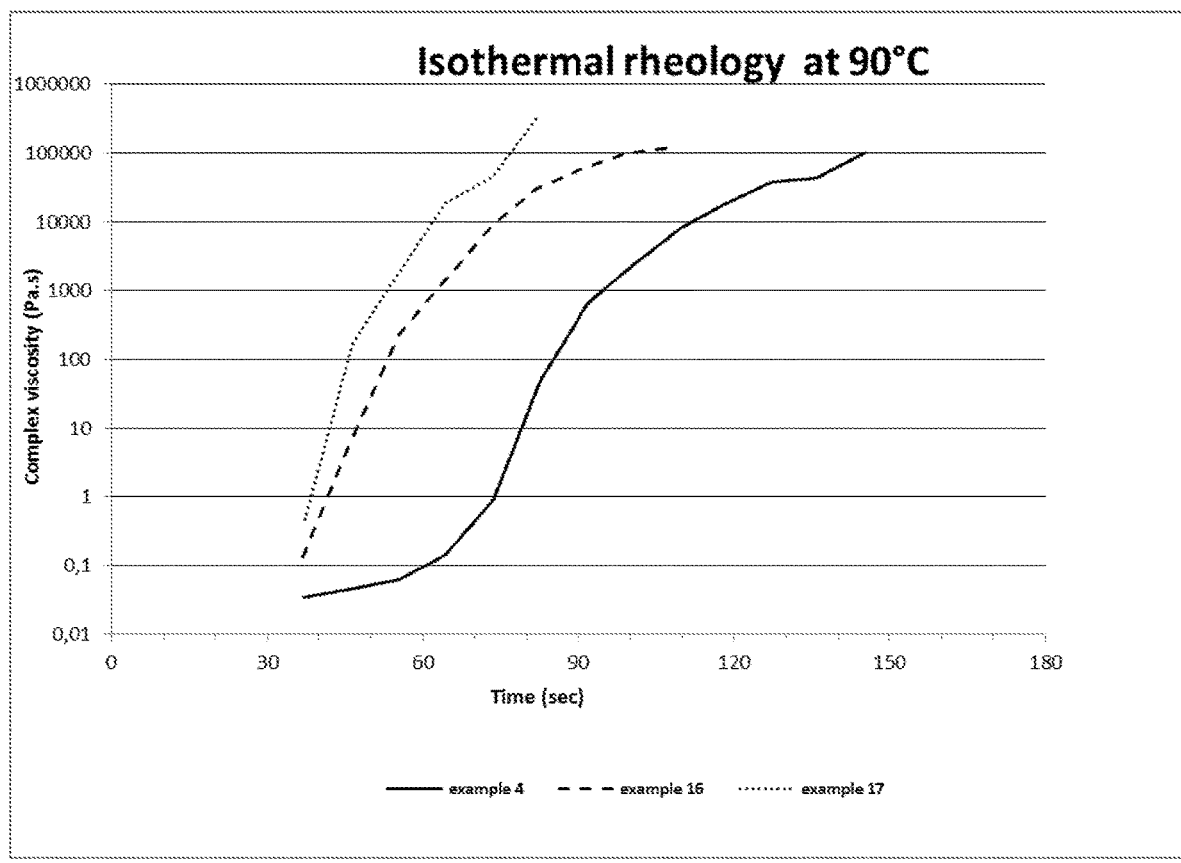

FIG. 6 illustrates the isothermal rheology profile at 90° C. for a 2-component reactive polyisocyanate system according to the present invention (examples 4 and 16) and for comparable example 17 (having a too high ratio of number of epoxide equivalents per isocyanate equivalents (>0.1)).

DETAILED DESCRIPTION

According to a first aspect of the present invention, an in-situ formed polyurethane catalyst is disclosed and a process for making said in-situ formed polyurethane catalyst.

Surprisingly we have found that the pot-life of a polyisocyanate reactive system for making polyurethane comprising materials may be remarkably extended (longer) by using the in-situ formed polyurethane catalyst composition according to the invention, without negatively influencing the curing of the reactive system afterwards.

By using classic polyurethane catalysts in a polyisocyanate reactive system there is an induction time of seconds to minutes, even at room temperature. For a lot of applications it is however desired to have a longer induction time (also referred to as "pot-life" of the reactive composition) to make for example handling of the reactive composition possible. Ideally this longer induction time (pot-life) is then followed by a rapid cure once the polyurethane catalyst is initiated. Alkoxides are known polyurethane catalysts which show rapid cure in a reactive mixture but without the additional benefit on pot-life. We have found a way to form (metal) alkoxides in-situ by combining the ingredients (compounds) required to form alkoxides in the reactive mixture. Once the critical amount of (metal) alkoxides is formed in the reactive mixture, the catalytic effect starts to take place immediately (rapid cure).

For Resin Transfer Molding (RTM) applications, a low viscosity and sufficient time for impregnation are the two key characteristics that are needed to achieve quality finished parts. The ideal viscosity of a RTM resin should be in the range 50 up to 200 cps (50 up to 200 mPas), preferably below 150 cps (below 150 mPas) for at least 35 seconds at processing temperature (typically referring to the mold temperature, which is e.g. 90° C.) in order to be able to fill the reaction mold optimal at processing times. The change in viscosity of the reactive mixture at processing temperature can be taken as an indication to determine the delay in reactivity of the reactive mixture.

The present invention hence discloses a new polyurethane catalyst system which allows formation of a (metal) alkoxide catalyst in-situ which provides the extra benefit on extending pot-life.

The in-situ formed polyurethane catalyst according to the invention is formed by combining in a reactive composition comprising polyisocyanate compounds and isocyanate reactive compounds at least following compounds:
at least one lithium halide compound, and
at least one epoxide compound
wherein the amount of epoxide to be used is such that the number of epoxide equivalents per isocyanate equivalents is from larger than 0 up to 0.095, preferably in the range 0.01 up to 0.095, more preferably in the range 0.03 up to 0.09 and the number of moles of lithium halide per isocyanate equivalent ranging of from 0.0001-0.06.

The amount of epoxide equivalents with respect to isocyanate equivalents is critical in this invention, a too high ratio of number of epoxide equivalents per isocyanate equivalents (>0.1) will give a too quick reaction and the viscosity of the reactive mixture will increase too rapidly and not fall within the recommended viscosity range required for e.g. RTM applications.

The reactive mixture comprising the in-situ formed polyurethane catalyst according to the invention has a good pot-life under ambient conditions. It is ideally suitable to make a polyurethane comprising material by allowing it to react at elevated temperature, preferably above 50° C., more preferably above 80° C.

In general, the polyisocyanate compound(s) according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, methylene diphenyl diisocyanate (MDI) and polyisocyanate compositions comprising methylene diphenyl diisocyanate (like so-called polymeric MDI, crude MDI, uretonimine modified MDI, compounds comprising biuret and/or allophanate groups and prepolymers having free isocyanate groups) and mixtures of such polyisocyanates. Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

The NCO value of the reactive system according to the present invention may range from 1 to 48% by weight and preferably ranges from 10 to 33% by weight.

In general, the isocyanate reactive compound(s) according to the present invention may be selected from polyester and/or polyether polyols and/or monools having an average molecular weight of 32-6000 and an average nominal functionality of 1-8.

Examples of such monools are methanol, ethanol, propanol, butanol, phenol, cyclohexanol and hydrocarbon monools having an average molecular weight of 32-5000 like aliphatic and polyether monools.

Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Such monools and polyols are commercially available. Useful examples are Daltocel F555 and Daltocel F442, which are all polyether triols from Huntsman, and Voranol P400 and Alcupol R1610, which are polyether polyols from DOW and Repsol, respectively, and Priplast 1838 and 3196 which are high molecular weight polyester polyols from Croda, and Capa 2043 polyol, a linear polyesterdiol of average MW of about 400 from Perstorp, and K-flex polyols 188 and A308 which are polyester polyols from King Industries having a MW of about 500 and 430 respectively, and aromatic polyester polyols like Stepanpol PH56 and BC180 having average molecular weights of about 2000 and 600 respectively, and Neodol 23E which is an aliphatic monool from Shell. Most preferred are polyester and polyether polyols having an average molecular weight of 32-6000 and an average nominal functionality of 1-8.

According to embodiments, the amount of epoxide to be used is such that the number of epoxide equivalents per isocyanate equivalents is from larger than 0 up to 0.095, preferably in the range 0.01 up to 0.095, more preferably in the range 0.03 up to 0.09

According to embodiments, the amount of lithium halide to be used in the reactive mixture is in the range 0.0001-0.06, preferably in the range 0.00015-0.025 moles lithium halide per isocyanate equivalent and most preferably of 0.0005-0.02 moles lithium halide per isocyanate equivalent and preferably is selected from lithium chloride and lithium bromide. Lithium chloride is most preferred.

The lithium halide may be first dissolved in a solvent, said solvent may be selected from a solvent which is not reactive with NCO groups (preferred) or alternatively (les preferred) from solvents which are reactive with NCO groups like monools, polyols and water. Examples of solvents have been given further in this specification.

The epoxide compound used may be selected from any epoxide which is liquid at process temperatures or at least dissolvable in one of the ingredients of the reactive composition.

Examples of suitable epoxides are:

1) Polyglycidyl and poly(β-methylglycidyl) esters, obtainable by reacting a compound having at least two carboxyl groups in the molecule and, respectively, epichlorohydrin and β-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexahydrophthalic acid, may also be used.

Furthermore, aromatic polycarboxylic acids, such as, for example, phthalic acid, isophthalic acid or terephthalic acid, may be used.

2) Polyglycidyl or poly(β-methylglycidyl) ethers, obtainable by reacting a compound having at least two free alcoholic hydroxyl groups and/or phenolic hydroxyl groups with epichlorohydrin or β-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trim ethylolpropane, pentaerythritol or sorbitol, and from polyepichlorohydrins. Further glycidyl ethers of this type are derived from cycloaliphatic alcohols, such as 1,4-cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis (2-hydroxyethylamino)-diphenylmethane.

The glycidyl ethers may also be based on mononuclear phenols, such as, for example, p-tert-butylphenol, resorcinol or hydroquinone, or on polynuclear phenols, such as, for example, bis(4-hydroxyphenyl)methane, 4,4'-dihydroxybiphenyl, bis(4-hydroxyphenyl) sulphone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

3) Poly(N-glycidyl) compounds, obtainable by dehydrochlorination of the reaction products of epichlorohydrin with amines which contain at least two amine hydrogen atoms. These amines are, for example, aniline, n-butylamine, bis (4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

4) Poly(S-glycidyl) compounds, for example di-S-glycidyl derivatives, which are derived from dithiols, such as, for example, ethane-1,2-dithiol or bis(4-mercaptomethylphenyl) ether.

5) Cycloaliphatic epoxides, such as, for example, bis(2, 3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxides in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Particularly preferred epoxides are those mentioned in 1) and 2) and most preferred are those mentioned in 2).

Suitable non-reactive solvents (which optionally may be used) may be selected from solvents having no isocyanate-reactive groups, preferably selected from an organic solvent which is liquid at 20° C. Solvents having a viscosity at 20° C. of 3000 mPa·s or less as measured according to ASTM D445-11a are regarded as liquid solvents. Most preferred are organic, liquid solvents which are able to dissolve more than 1 mg of a certain lithium halide compound per litre solvent at 20° C.

Those skilled in the art can easily determine whether or not an organic liquid is suitable for use as solvent in the present invention, certainly with the above guidance. Examples of suitable solvents are esters (such as ethyl acetate, propyl acetate, propylene carbonate, phthalate esters), ketones (such as acetone, methyl ethyl ketone, methyl isobutyl ketone, cyclohexanone), aliphatic hydrocarbons (such as cyclohexane, heptane), chlorinated hydrocarbons (such as chloroform, dichloromethane), aromatic solvents (such as benzene, toluene), ethers (such as dimethyl ether, diethyl ether, dioxane, tetrahydrofuran) and mixtures thereof. Most preferably solvents are selected which have a low boiling point at ambient pressure or under vacuum (then they may be stripped off from the curable composition easily). The amount of solvent may vary between wide ranges. The lower limit is determined by the desired type and amount of lithium halide compound and its solubility in the selected solvent. The upper limit is determined by considerations of convenience and cost: the less the better.

According to a second aspect of the present invention, a reactive system comprising the in-situ polyurethane catalyst of the invention is disclosed. The reactive system is made by combining at least
 a monool and/or polyol composition,
 at least one lithium halide compound,
 a polyisocyanate composition comprising polyisocyanate compounds, and
 at least one epoxide compound
in such an amount that the number of epoxide equivalents per isocyanate equivalents is from larger than 0 up to 0.095, preferably in the range 0.01 up to 0.095, more preferably in the range 0.03 up to 0.095 and the number of moles of lithium halide per isocyanate equivalent ranging of from 0.0001-0.06.

The polyisocyanate composition in the reactive system comprising the in-situ polyurethane catalyst of the invention preferably has an average isocyanate value of 1 to 48% by weight and preferably from 10 to 33% by weight.

The reactive system comprising the in-situ polyurethane catalyst of the invention preferably has an isocyanate index is in the range 60-750, preferably in the range 70-400, more preferably in range 80-150 and most preferred in the range 80-130.

The reactive system comprising the in-situ polyurethane catalyst of the invention may further comprise additives such as other catalysts, blowing agents, surfactants, water scavengers, antimicrobial agents, fire retardants, smoke suppressants, UV-stabilizers, colorants, plasticizers, internal mould release agents, rheology modifiers, wetting agents, dispersing agents and fillers.

According to the third aspect of the present invention a process for preparing the reactive system comprising the in-situ polyurethane catalyst and use of the reactive system comprising the in-situ polyurethane catalyst for making a polyurethane comprising material is disclosed.

The reactive system comprising the in-situ polyurethane catalyst of the invention is made by combining and/or dissolving at least one lithium halide compound(s) and a monool or polyol composition comprising isocyanate reactive compounds, a polyisocyanate composition comprising polyisocyanate compounds, at least one epoxide compound(s) and optional reactive or non-reactive solvents and/or further additives such as other catalysts, blowing agents, surfactants, water scavengers, antimicrobial agents, fire retardants, smoke suppressants, UV-stabilizers, colorants, plasticizers, internal mould release agents, rheology modifiers, wetting agents, dispersing agents and fillers.

According to embodiments, the reactive system comprising the in-situ polyurethane catalyst of the invention may be made by combining and/or mixing first a monool or polyol composition comprising isocyanate reactive compounds and at least one lithium halide compound optionally dissolved in a reactive or non-reactive solvent. The monool or polyol composition comprising the lithium halide compounds may then be combined with a polyisocyanate composition comprising polyisocyanate compounds in order to form a polyisocyanate prepolymer. In a next step at least one epoxide compound(s) is added to the reactive mixture in order to form the in-situ polyurethane catalyst. Optionally, further additives may be added in the last step or in an additional step.

According to embodiments, the reactive system comprising the in-situ polyurethane catalyst of the invention may be made by forming two component systems which are then combined with each other. A first system is made by combining and/or mixing a monool or polyol composition comprising isocyanate reactive compounds and at least one epoxide compound(s) composition. A second system is made by combining and/or mixing a polyisocyanate composition comprising polyisocyanate compounds with at least one lithium halide compound(s). Optionally further additives may be added to either the first or second system. To form the reactive system comprising the in-situ polyurethane catalyst of the invention the first and second system are combined and/or mixed with each other, preferably at room temperature. Optionally, further additives and/or fillers may be added in the last step or in an additional step e.g. to form a polyurethane comprising composite material.

The reactive system comprising the in-situ polyurethane catalyst of the invention may be used for making a polyurethane comprising composite material. The process for making the polyurethane comprising composite material then starts with the step of adding and mixing additives and/or to be bonded material(s) to the reactive system before optionally heating the reactive system at elevated temperatures in order to cure the reactive system. The additives and/or to be bonded material(s) added to the reactive system may be selected from wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like BaSO4 and CaCO3; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

Further, the invention discloses the use of the in-situ formed polyurethane catalyst for improving the pot-life of a reactive polyisocyanate system for forming polyurethane comprising products.

The reactive composition comprising the in-situ polyurethane catalyst according to the invention may be used in any polyurethane forming application where extended pot-life is beneficial for the process. The use of the in-situ formed polyurethane catalyst is especially useful in situations where the exotherm makes the cure temperature rise too quickly.

The invention further discloses polyurethane comprising materials made using the reactive composition comprising the in-situ polyurethane catalyst according to the invention. Preferably said polyurethane comprising materials are made by allowing the reactive composition of the invention react at elevated temperature of at least 50° C., preferably at least 80° C. Polyurethane comprising materials may include foamed and non-foamed, as well as elastomeric to glassy polyurethane comprising polyurethane materials.

The polyurethane comprising materials according to the invention may be selected from polyurethane comprising rigid foams, polyurethane comprising flexible foams, polyurethane comprising elastomers (both thermoset and thermoplastic), polyurethane comprising non-foamed materials such as coatings, adhesives, binders and resins for composites).

The invention is illustrated with the following examples.

EXAMPLES

Chemicals Used:
Suprasec® 2050, MDI based isocyanate variant, ex Huntsman
Arcol® polyol 1004, PPG diol based polyol with a molecular weight of 425 g/mol ex Bayer
Jeffox® PPG-230, PPG diol based polyol with a molecular weight of 230 g/mol ex Huntsman
Jeffol® G30-650, glycerol initiated Polyol with a molecular weight of: 259 g/mol, ex Huntsman
Araldite® DY-D, epoxy based reactive diluent ex Huntsman titanium tetraisopropoxide 95%, ex Aldrich
K-Kat XC-227: bismuth complex, ex King Industries
Lithium chloride (LiCl) 99.6%, ex VWR chemicals
Araldite, Suprasec, Jeffol, Arcol, Jeffox and Daltocel are trademarks of the Huntsman Corporation or an Affiliate thereof and have been registered in one or more but not all countries.

Example 1

5 wt % LiCl Solution in Arcol® Polyol 1004

50 g LiCl is added to 950 g Arcol® polyol 1004 at 85° C. under stirring and nitrogen purge. The mixture is further heated at 85° C. under stirring until a clear solution is obtained, after ±4 hours. The mixture is then allowed to cool down to ambient temperature.

Example 2

LiCl Containing Prepolymer 50 g of the solution from example 1 is added over a time span of 30 min to 600 g of Suprasec 2050 at 65° C. under stirring and nitrogen purge.

After the addition the mixture is further heated under stirring and nitrogen purge for 30 min at 65° C. The mixture is allowed to cool down to ambient temperature, a clear amber colored liquid product is obtained.

Example 3

Prepolymer without LiCl (Comparable Example)

The same procedure is used as in example 2 except that 47.5 g Arcol polyol 1004 without LiCl is added to 600 g Suprasec 2050.

Example 4 and Comparative Example 5-9

Isothermal Rheology Time Sweep Measurements at 90° C.

100 g the ingredients in Table 1 below are mixed in a 150 ml plastic cup for 1 min at ambient temperature with a spatula, 0.5 ml of this mixture is applied on a 90° C. preheated spindel of the rheometer, the oven is closed and the spindels allowed to travel to a gap distance of 250 µm, 30 sec after applying the mixture the data acquiring is started.

The curing behaviour of the resin is followed by the complex viscosity increase versus time.

Isothermal rheology time sweep measurements at 90° C. were done on examples 4, 5, 6 and 7 and illustrated in FIG. 1 (Equipment: TA rheometer AR 2000).

Test Settings:
Oscillation measurement at 1 Hz/controlled variable,
Torque: 10 µN·m/geometry: 25 mm disposable aluminium spindels preheated to 90° C., gap 250 µm

TABLE 1

| | Examples of curable compositions**** | | | | | | | |
|---|---|---|---|---|---|---|---|---|
| | 4 | 5* | 6* | 7* | 8* | 9* | 16 | 17* |
| Prepolymer example 2 | 65 | — | — | 65 | — | — | 62.4 | 59.7 |
| Prepolymer example 3 | — | 64.75 | 64.75 | — | 64.75 | 64.75 | — | — |
| Jeffox PPG-230 | 5 | 5 | 5 | 5 | 5 | 5 | 4.79 | 4.59 |
| Jeffol G30-650 | 28 | 28 | 28 | 28 | 28 | 28 | 26.81 | 25.71 |
| Araldite DY-D | 2** | — | 2** | — | — | — | 6 | 10 |

TABLE 1-continued

| | Examples of curable compositions**** | | | | | | | |
|---|---|---|---|---|---|---|---|---|
| | 4 | 5* | 6* | 7* | 8* | 9* | 16 | 17* |
| Titanium tetraisopropoxide | — | — | — | — | 0.075*** | — | — | — |
| K-Kat XC-227 | — | — | — | — | — | 0.05 | — | — |
| Equiv. ratio LiCl/NCO | 0.012 | 0 | 0 | 0.012 | — | — | 0.012 | 0.012 |
| Equiv. ratio epoxide/NCO | 0.03 | 0 | 0.03 | 0 | 0.002 | — | 0.09 | 0.17 |

*comparative examples
**2 pbw Araldite DY-D = 16.5 mmol epoxide
***0.075 pbw Titanium tetraisopropoxide = 1.03 mmol isopropoxide
****All examples have isocyanate index = 111

For comparative example 8 and 9 no data could be collected due to the fast curing speed at 90° C., material already cured before data collection starts.

The first viscosity data point after 35 seconds at 90° C. for example 4 (ratio epoxide/NCO=0.03) is 55 cps which is according to the present invention and falls within the recommended viscosity range for RTM applications.

The first viscosity data point after 35 seconds at 90° C. for example 16 (ratio epoxide/NCO=0.09) is 133 cps which is according to the present invention and falls within the recommended viscosity range for RTM applications.

The first viscosity data point after 35 seconds at 90° C. for example 17 (ratio epoxide/NCO=0.17) is 470 cps which is not according to the invention and outside the recommended viscosity range for RTM applications.

The above examples 1-9 further demonstrate following features (1) the presence of both LiCl and epoxide are required to show a catalytic effect (example 4 versus comparative example 5)
(2) LiCl/epoxide combination is an efficient catalyst (example 4 versus comparative examples 6 and 7)
(3) Using classic polyurethane catalysts or alkoxides do not provide processing time at elevated temperatures (comparative example 5 versus comparative examples 8 and 9)
(4) Using a too high ratio of number of epoxide equivalents per isocyanate equivalents (>0.1) will give a too quick reaction and the viscosity of the reactive mixture will increase too rapidly and not fall within the recommended viscosity range required for e.g. RTM applications (comparative example 17 versus examples 4 and 16)

In FIG. 6, the viscosity (measured according to ASTM D445-11a) in function of time is illustrated for examples 4, 16 and 17 using a TA rheometer AR 2000.

Example 10, Comparative Example 11-15

Curing Exotherm Measurements 50 g of the ingredients in Table 2 below are mixed in a 150 ml plastic cup at ambient temperature for 1 min with a spatula, the reaction exotherm is recorded with a Type-K thermocouple when the mixing starts.

Temperature increase is followed versus time until a solid material is obtained and illustrated in FIGS. 2 and 3.

TABLE 2

| | Examples of curable compositions **** | | | | | |
|---|---|---|---|---|---|---|
| | 10 | 11* | 12* | 13* | 14* | 15* |
| Prepolymer example 2 | 32.5 | — | — | — | — | — |
| Prepolymer example 3 | — | 32.37 | 32.37 | 32.37 | 32.37 | 32.37 |
| Jeffox PPG-230 | 2.5 | 2.5 | 2.5 | 2.5 | 2.5 | 2.5 |
| Jeffol G30-650 | 14 | 14 | 14 | 14 | 14 | 14 |
| Araldite DY-D | 1** | — | — | — | — | — |
| Titanium tetraisopropoxide | — | 0.3 | 0.15 | 0.075*** | — | — |
| K-Kat XC-227 | — | — | — | — | 0.05 | 0.025 |
| Equiv. ratio LiCl/NCO | 0.012 | — | — | — | — | — |
| Equiv. ratio epoxide/NCO | 0.03 | 0.016 | 0.008 | 0.004 | — | — |

*comparative examples
**1 pbw Araldite DY-D = 8.25 mmol epoxide
***0.075 pbw Titanium tetraisopropoxide = 1.03 mmol isopropoxide
****All examples have isocyanate index = 111

The above examples 10-15 demonstrate following features:

(1) Compared to classic polyurethane catalyst and alkoxide, the combination of LiCl/epoxide provides a significantly longer pot-life when curing at ambient temperature
(2) In spite of the long pot-life, the combination of LiCl/epoxide is an efficient catalyst also at room temperature From the compositions in examples 10, 13 and 15 DSC graphs were recorded with a TA Q2000 DSC apparatus in TA Tzero aluminium pans of 50 µl and sample size between 5 and 10 mg according to the following procedure:
Equilibrate at 0° C.
Isothermal for 2 minutes
Ramp at 5° C./min to 200° C.

From the resulting DSC graph (see FIG. 6) it is clear that the maximum of the exotherm peak appears at substantially higher temperatures for the composition comprising the LiCl/epoxide system (example 10) compared with the composition comprising a classical PU catalyst (example 15) and compared with the composition comprising an alkoxide compound as PU catalyst (example 13).

The invention claimed is:

1. A reactive system for catalyzing the formation of polyurethane said reactive system comprising:
at least one lithium halide compound,
at least one epoxide compound, a polyisocyanate composition comprising polyisocyanate compounds, and a monol or polyol composition, wherein the at least one lithium halide and at least one epoxy compound form an in situ polyurethane catalyst, the isocyanate index is in the range of 80-150, the amount of epoxide to be used is such that the number of epoxide equivalents per isocyanate equivalents is from larger than 0 up to 0.095 and the number of moles of lithium halide per isocyanate equivalent ranging of from 0.0001-0.06; wherein the reactive system has a viscosity ranging from 50 cps to 200 cps for at least 35 seconds at a temperature of 90° C.

2. The reactive system according to claim 1, wherein the polyisocyanate compounds are selected from a toluene diisocyanate, a methylene diphenyl diisocyanate or a polyisocyanate composition comprising a methylene diphenyl diisocyanate or a mixture of such polyisocyanate compounds.

3. The reactive system according to claim 1, wherein the number of moles of lithium halide per isocyanate equivalent is ranging from 0.00015-0.025 moles per isocyanate equivalent.

4. The reactive system according to claim 1 wherein the number of epoxide equivalents per isocyanate equivalents is in the range 0.01 up to 0.095.

5. The reactive system according to claim 1, wherein the isocyanate reactive compounds are selected from a polyester and/or polyether polyol having an average molecular weight of 32-6000 and an average nominal functionality of 1-8.

6. The reactive system according to claim 1, wherein the lithium halide is selected from lithium chloride and lithium bromide.

7. The reactive system according to claim 1, wherein the epoxide is liquid at room temperature.

8. The reactive system according to claim 1, wherein the polyisocyanate composition has an average isocyanate value of 1 to 48% by weight.

9. The reactive system according to claim 1, wherein the number of moles of lithium halide per isocyanate equivalent is ranging from 0.00015-0.025 moles per isocyanate equivalent.

10. The reactive system according to claim 1, wherein the number of epoxide equivalents per isocyanate equivalents is in the range 0.01 up to 0.095.

11. The reactive system according to claim 1, wherein the isocyanate index is in the range 80-130.

12. The reactive system according to claim 1, further comprising additives selected from the group consisting of catalysts, blowing agents, surfactants, water scavengers, antimicrobial agents, fire retardants, smoke suppressants, UV-stabilizers, colorants, plasticizers, internal mould release agents, rheology modifiers, wetting agents, dispersing agents and fillers.

13. A process for making the reactive system according to claim 1, which process comprises combining and dissolving the at least one lithium halide compound and the monool or polyol composition, the polyisocyanate composition, the at least one epoxide compound and optional further additives and/or fillers according to claim 1.

14. A process for making a polyurethane comprising material by allowing the ingredients of the reactive system according to claim 1 to react at elevated temperature of at least 50° C.

15. The process according to claim 14, further comprising before the step of heating said reactive system at elevated temperatures of at least 80° C. the step of adding and mixing additives and/or to be bonded material(s) to the reactive system such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyimide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

16. A polyurethane comprising material made by allowing the reactive composition according to claim 1, to react at elevated temperature of at least 50° C.

* * * * *